United States Patent [19]

Oguey et al.

[11] Patent Number: 4,645,294
[45] Date of Patent: Feb. 24, 1987

[54] VARIABLE OPTICAL ATTENUATOR FOR OPTICAL FIBER COUPLING

[75] Inventors: Claude Oguey, Saint Michel sur Orge; Daniel Jamet, Nozay; Alain Berreby, Yerres, all of France

[73] Assignee: Compagnie Lyonnaise de Transmissions Optiques, Clichy, France

[21] Appl. No.: 680,446

[22] Filed: Dec. 11, 1984

[30] Foreign Application Priority Data

Dec. 16, 1983 [FR] France .................. 83 20214

[51] Int. Cl.⁴ .......................... G02B 6/26; G02B 6/42
[52] U.S. Cl. ................................................ 350/96.15
[58] Field of Search .................. 350/90.15, 20, 16, 21, 350/29

[56] References Cited

U.S. PATENT DOCUMENTS 4,196,032  4/1980  Eggleston ................. 350/96.23

FOREIGN PATENT DOCUMENTS 0156812  12/1981  Japan ...................... 350/96.20
0129403   8/1982  Japan ...................... 350/96.20
0111120   6/1984  Japan ...................... 350/96.21

OTHER PUBLICATIONS

Electro-Optical Systems Design, vol. 18, No. 2, Feb. 1981, pp. 33–41.
Patent Abstracts of Japan, vol. 6, No. 225, Nov. 10, 1982.
Patent Abstracts of Japan, vol. 2, No. 1, Jan. 5, 1977.
Patents Abstracts of Japan, vol. 5, No. 142, Sep. 8, 1981.
Applied Optics, vol. 19, No. 14, Jul. 15, 1980.

*Primary Examiner*—William L. Sikes
*Assistant Examiner*—Robert E. Wise
*Attorney, Agent, or Firm*—Sughrue, Mion, Zinn, Macpeak and Seas

[57] ABSTRACT

The variable optical attenuator varies the angle and distance of coupling between two fiber ends by moving the end of one of the fibers along a circular arc passing through the end of the other fiber. It comprises a rectangular block 3 to support said fibers 1 and 2, having a slit 6 through its end, running parallel to its broad surfaces and dividing the block into two branches 7, 8, a cylindrical through hole 9 traversing one of the branches 7 substantially in line with the inside end of the slit and opened on the side of the supporting surface 4 of the block to establish the coupling zone between the fibers afixed to said surface, and driving and control means 20, 25 for swivelling the branch 7 carrying one of the fibers, which means act substantially on the free end of said branch 7.

10 Claims, 7 Drawing Figures

VARIABLE OPTICAL ATTENUATOR FOR OPTICAL FIBER COUPLING

FIELD OF THE INVENTION

This invention relates to high rate transmissions using single-mode optical fibers. It specifically concerns a variable optical attenuator enabling accurate measurements of the error rate of such transmission systems and tuning of the switchgear used in these systems. Such an attenuator must be accurate, compact and of simple and low cost construction.

BACKGROUND OF THE INVENTION

The utilization of single-mode fibers in high rate transmission systems has prompted the use of single-fiber optical attenuators therein, the attenuation function whereof is obtained by playing on the coupling parameters of a fiber-to-fiber junction, said parameters being the tilt angle of the two fiber ends and the distance between the two fiber ends or the two orthogonal components defining said distance.

Modifications made to these parameters either separately or, preferably, simultaneously, provide a variable attenuation according to a known law of variation.

The article entitled, "Variable attenuator for use in single-mode fiber transmission systems," published in the July 15, 1980 issue of *Applied Optics* (Vol. 19, No. 14, pages 2435 to 2438), deals with a variable attenuation rate obtained by combining these coupling parameters for a fiber-to-fiber junction. The basic idea of the attenuator described in this article consists in making the end of one of the fibers movable along a circular arc in an attenuation element defining the fiber-to-fiber junction of the attenuator. In the embodiment illustrated, the attenuation element comprises a support with a V-shaped groove on a concave surface, termed the "curved V-channel" for its circular arc shape, which receives the two ends of the two single-mode fibers defining the junction. On this support, the end of one of the fibers is fixed in the channel whereas the end of the other fiber is movable along the channel. The moving fiber is attached to the end of a pivotably mounted arm whose pivot is at the V-channel curvature center. The arm is driven by a precision micrometer head controlling the extent of its motion.

In this type of construction, both fibers are necessarily mounted in V-channels, for purposes of precision and of reproducibility of the attenuation values based on groups of values taken individually by the coupling parameters. The range of possible attenuation values as well as the accuracy and reproducibility of the attenuation values are thus limited by the very nature of this means of holding the fiber ends relative to one another and by the spurious reflections on the channel walls when the distance between the fiber ends is increased. Moreover, the precision and the reproducibility of the attenuation values, tied as they are to the precision channel machining, are also directly dependent upon the attenuator operating and handling conditions, which conditions may lead to damage of the fiber end moving in the channel and/or, in the event of shocks or vibrations being applied to or transmitted to the attenuator, to a fiber's partly or entirely leaving the V-groove, particularly the moving fiber, which is kept in the bottom of the groove by its springiness alone.

The present invention is directed to providing a variable optical attenuator of simple design which is easy to manufacture on an industrial scale and avoids the above-mentioned disadvantages.

SUMMARY OF THE INVENTION

It provides a variable optical attenuator comprising an attenuation element which achieves a variable coupling between the ends of two optical fibers mounted on a support, by moving the end of one of the fibers along a circular arc passing through the end of the other fiber, wherein both of said fibers are fixed to the support, said support being a rectangular block supporting said fibers on one of its broad surfaces, termed the supporting surface, said block having a slit in one of its ends, parallel to its broad surfaces, long enough to establish two block branches on either side thereof, a first branch being bounded by said supporting surface and a second branch being bounded by the block's other broad surface, and furthermore having a cylindrical through-hole transversally crossing said first branch, substantially at the level of the inside end of the slit, and opening onto said supporting surface where it establishes the coupling zone between said fibers, and wherein means are further provided for rotatively or angularly driving said first branch by elastic deformation of said cylindrical hole, said driving means acting substantially on the free end of said first branch.

According to a preferred embodiment of the invention, the driving means include a threaded rod, one end whereof is held by, but free to rotate in, the free end of said first branch, and a rigid rectangular bar one end of which is traversed by said rod and the other end of which is attached to said support block along that part of the length of the block which is not divided by said slit.

These and other features and advantages of the invention will be more readily understood in reading the following description of several embodiments thereof given by way of example, with reference to the accompanying drawings wherein:

DESCRIPTION OF PREFERRED EMBODIMENTS

Figure 1:
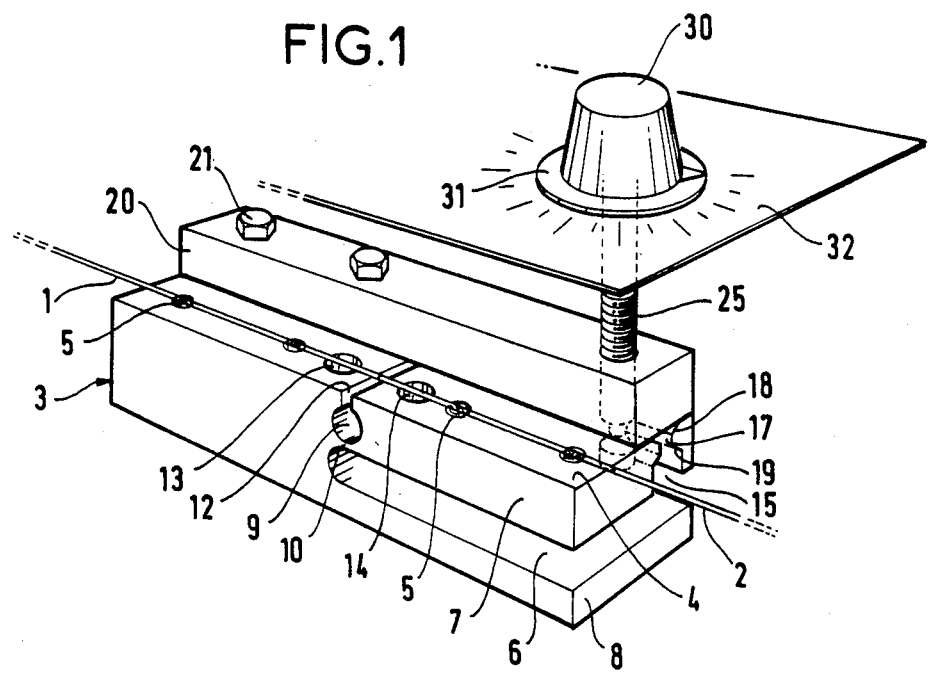
FIGS. 1 and 2 are perspective views of a variable optical attenuator according to the invention under different fiber coupling conditions.
Figure 2:
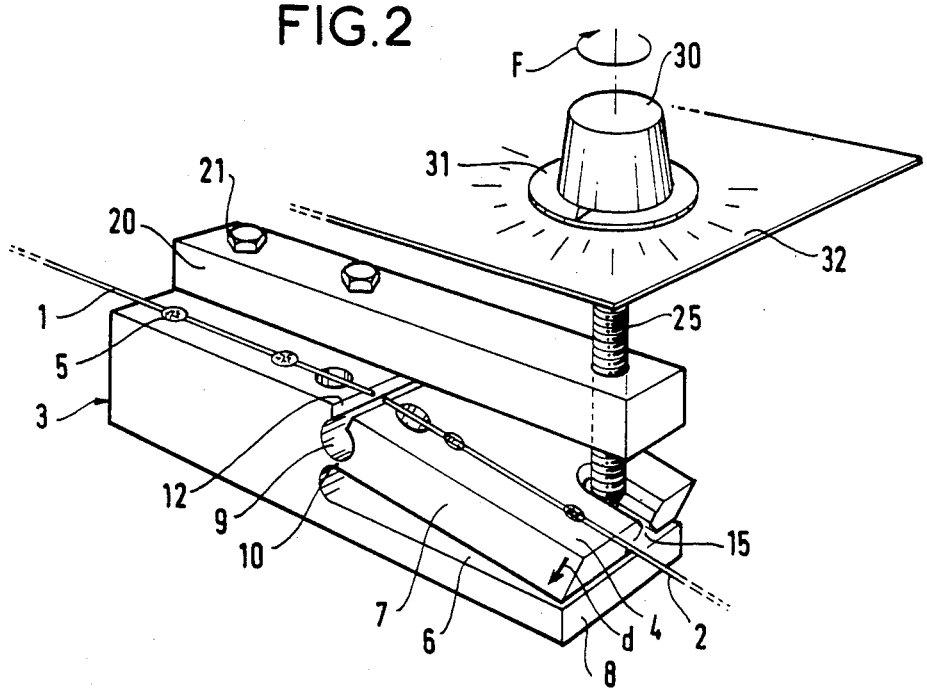

FIGS. 1 and 2 show one embodiment of the optical attenuator according to the invention, or more specifically, the attenuation element incorporated in such an optical attenuator, which provides a variable coupling between the ends of two single-mode optical fibers 1 and 2. This attenuation element provides variable attenuation by moving the end of one of the fibers along a circular arc along which the end of the other fiber is fixed. In an actual optical attenuator of this type, the other ends of the respective fibers 1 and 2 are coupled to the fibers of an outside line which is not shown in the drawings.

The attenuation means comprises a supporting block 3 for the two fibers 1 and 2, shaped basically as a rectangular prism. The two fibers 1 and 2 are aligned with one another on one of the block's broad, flat surfaces, or fiber supporting surface 4, and are attached to said broad surface at adhesive bonding points such as point 5 after precise adjustment of the relative positioning of their respective coupling ends with the help of a binocular device and a tong-type precision manipulator.

The block 3 has a slit 6 parallel to its broad sides, which extends part way into the block and in this case substantially halfway through the block. Said slit 6 divides its part of the block into two branches 7 and 8. The block also has a cylindrical hole 9, formed in branch 7—the branch which includes part of the supporting surface 4 for the fibers—substantially at the level of the inside end of slit 6 and parallel to the inside end wall of said slit. Said cylindrical hole 9 is a through hole. It is separated from the slit 6 by a thin wall extending across branch 7 along the length of the hole and the breadth of the slit, the thinnest part whereof, designated by the number 10 in the drawing, will be referred to hereinafter as the hinge 10. The hole 9 is opened throughout its length into fiber supporting surface 4, said opening being in the form of a narrow window 12 cutting across said surface 4 substantially opposite said hinge 10.

The very ends of the coupling fibers 1 and 2 are free of any adhesive bonding points and extend over said window 12.

The supporting block 3 moreover has two blind holes 13 and 14, provided in the fiber supporting surface 4 to each side of window 12 in the path of the fibers. These holes are large compared with the diameter of the fibers extending over their surfaces, thus making easier the positioning of the fiber ends relative to one another, by allowing all round movement of the tips of the fiber grasping tongs of the above-mentioned precision manipulator.

The supporting block 3 is preferably made from an easily machined brass-based material having a modulus of elasticity of the order of 50 daN/mm$^2$, such as the material known by the tradename "Nicladec 3444" sold by Le Comptoir Lyon Alemand Louyot.

The attenuation element further comprises a rigid rectangular bar 20 and a threaded control rod 25 which work together and with supporting block 3 to move one of the fibers for attenuation purposes.

Rectangular bar 20 is a rigid, solid bar. It bears on the fiber supporting surface 4 and is attached to the block 3 with screws 21 only along the second half of the block, ie. on that part of the block which is not divided into branches by slit 6, such that branch 7 and bar 20 are not directly attached to one another. The rectangular bar 20 extends over the whole length of surface 4 but covers only half the width of said surface 4, the remaining half of the surface serving to support the two fibers. The bar 20 is provided with a close-pitched tapped hole, not numbered in the drawings, near the end of the portion which is not attached to the supporting block 3, designed to cooperate with the matchingly threaded control rod 25.

Figure 3:
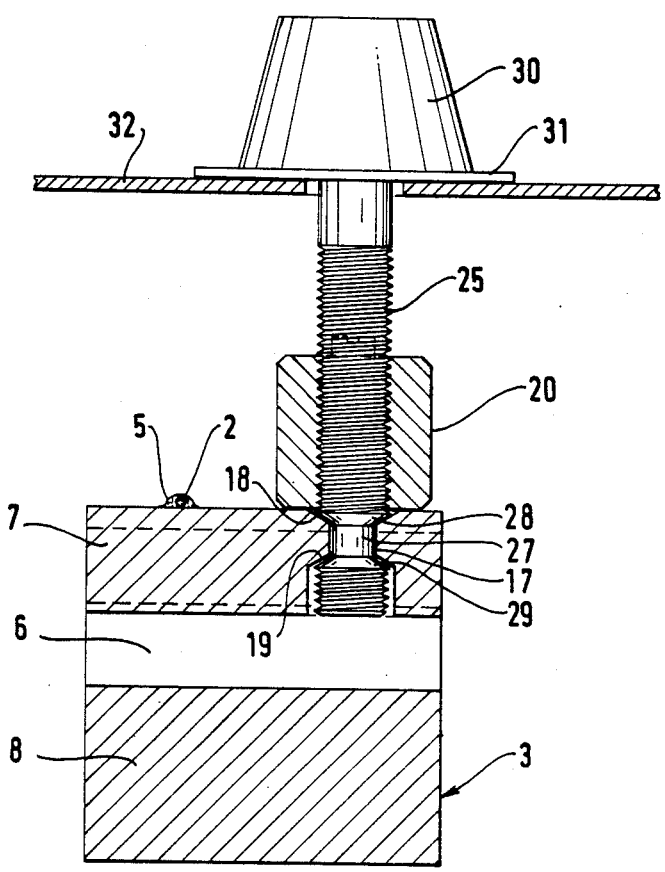
FIG. 3 is a cutaway cross-sectional view of the driving or control means for the optical attenuator depicted in FIGS. 1 and 2.

Looking at FIGS. 1 and 2, and especially FIG. 3, it can be seen that this threaded rod 25, which is screwed through the rectangular bar, has one end captive, but free to rotate, in the end of the branch 7 in block 3.

The end of the rod engaged in branch 7 is provided for catching purposes with a neck 27 and two conical shoulders 29 and 29 tapering in from the threaded end of the rod on the one hand and from the other adjacent threaded portion of the rod on the other hand, giving it the shape of a diabolo top or hourglass. The end of the branch 7 is provided with a matching opening 15 to mate with the hourglass-shaped end of rod 25, said opening 15 issuing at the end of branch 7 so that the rod can be inserted therethrough. The hole's rib 17 and tapered rib sides 18 and 19 engaging with the body of the branch respectively fit around the neck 27 and bear against the conical shoulders 28 and 29 of rod 25 to hold the hourglass-shaped portion of the rod whilst allowing the rod to rotate.

The other end of rod 24 carries a control knob 30 having an indexing collar 31 for rotative setting with respect to a graduated plate or dial 32 at the periphery thereof.

As is apparent from FIGS. 1 and 2, the coupling of the fibers is made variable by merely rotating the control knob 30 in the direction of arrow F of FIG. 2 from the initial position shown in FIG. 1. Such rotation causes the rod 25 to advance through the rigid bar 20 and to push down on the free end of branch 7, thus causing the branch 7 to pivot down around hinge 10 in the direction of arrow d of FIG. 2 by elastic deformation of the cylindrical hole 9. The coupling end of fiber 2, carried by this branch 7, thus moves along a circular arc centered on hinge 10, in front of the coupling end of the other fiber 1.

Besides being easy to manufacture and to operate, this variable attenuator affords a number of additional advantages, especially in terms of precision and reproducibility. The latter advantages are inherent to its structure and are attributable in particular to:

the securing of all but the ends of the fibers to the support, and thus to the absence of any movement of either fiber relative to its support;

the positioning of the fiber ends within a junction or coupling zone that is entirely free of metal surfaces in the vicinity of their coupling faces, which might produce spurious reflections;

the possibility of an initial, on the spot, positional adjustment of the fibers' coupling faces to compensate any mismatchings between fibers, to keep attenuator-related coupling losses to a minimum, and the possibility of preliminary calibration of the variable attenuation;

and the small range of movement of the end of the branch 7 in response to control action on the knob and the considerable reduction afforded by the branch with respect to the actual displacement of the coupling end of the fiber carried thereon.

Figure 4:
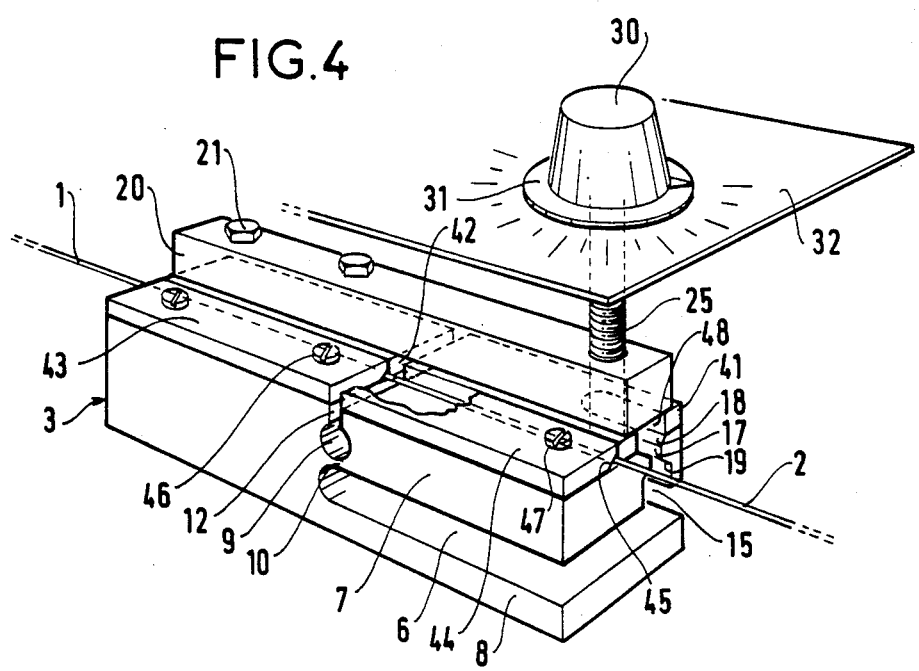
FIGS. 4 and 5 are perspective drawings of an alternative embodiment of the optical attenuator shown in FIGS. 1 and 2, showing substantially the same fiber coupling conditions.
Figure 5:
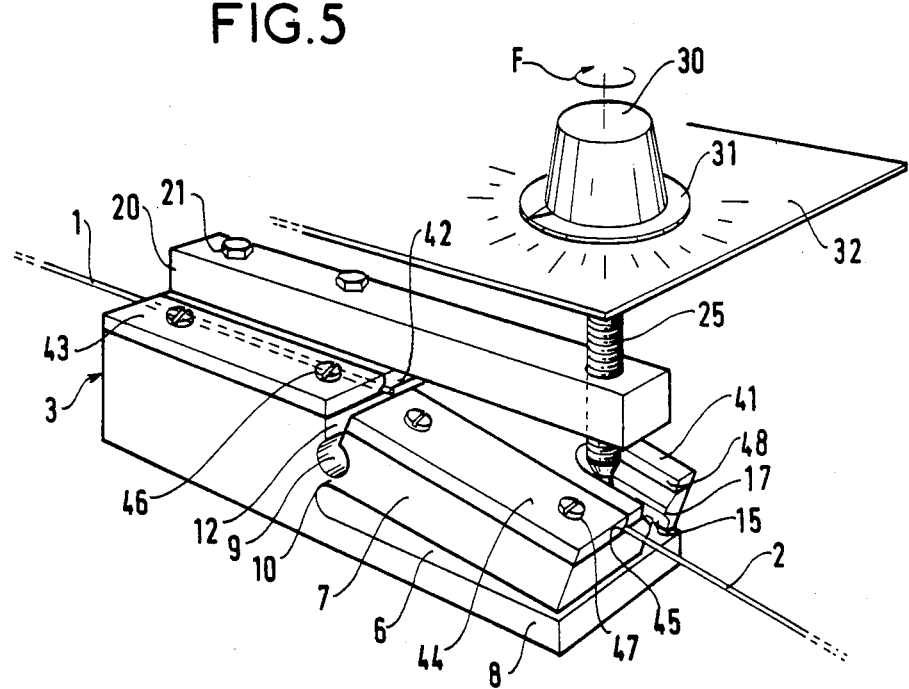
Figure 6:
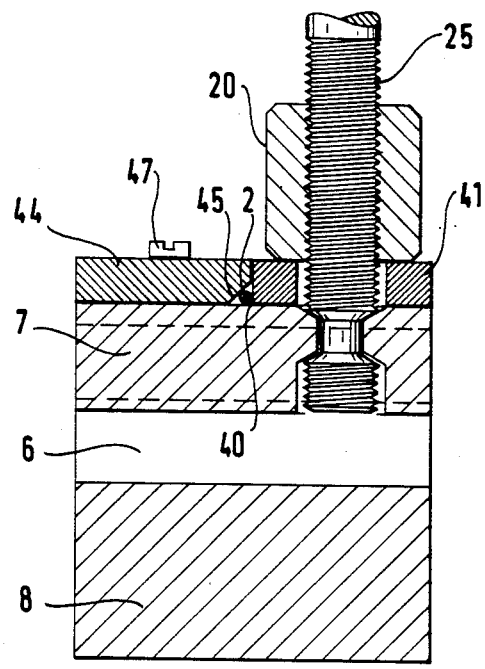
FIG. 6 is a cutaway cross-sectional view of the driving or control means for the optical attenuator depicted in FIGS. 4 and 5.

Referring now to FIGS. 4, 5 and 6, an alternative embodiment of the previous variable optical attenuator is shown, wherein like items are designated by the same references as in FIGS. 1 through 3 and will not be again described.

The differences between the two embodiments basically relate to the method of positioning the fibers 1 and 2. In this embodiment, fibers 1 and 2 are positioned at the bottom of a V-groove 40, more clearly apparent in FIG. 6, which is formed between the supporting surface 4 of the block 3 and the side wall of a positioning plate 41, narrower than the supporting block 3, said plate partially covering the surface 4 of the block to which it is attached. Coupling of the fibers also takes place in the window 12 of the block and of a slit 42 aligned with window 12 which splits the positioning plate 41 into two parts, one of said parts moving with branch 7 and the other being clamped to the non-branched part of the block, said slit 42 being preferably machined together with window 12 for better alignment of the two. The two fibers 1 and 2 are kept in the bottom of their V-groove by two holding plates 43 and 44 both of which are accordingly provided with a chamfered edge 45. The latter plates have substantially the same thickness as the positioning plate. They abut positioning plate 41 and extend over fiber supporting surface 4 to each side of window 12 and are attached to block 3 by means of screws 46 and 47.

As finally assembled, the positioning plate 41, fixed to support 3 and split into two parts, is thus merely laid between the supporting block 3 and the rigid bar 20. It juts out below the rigid bar to reach the V-groove which it forms with the support. Its end on the end of branch 7 housing the hourglass-shaped end of rod 25, is given a wide slot allowing the rod to pass freely therein.

The operation of this second embodiment of the attenuator is apparent from FIGS. 4 and 5, taken by comparison with FIGS. 1 and 2 It is identical to that of the first embodiment described.

Figure 7:
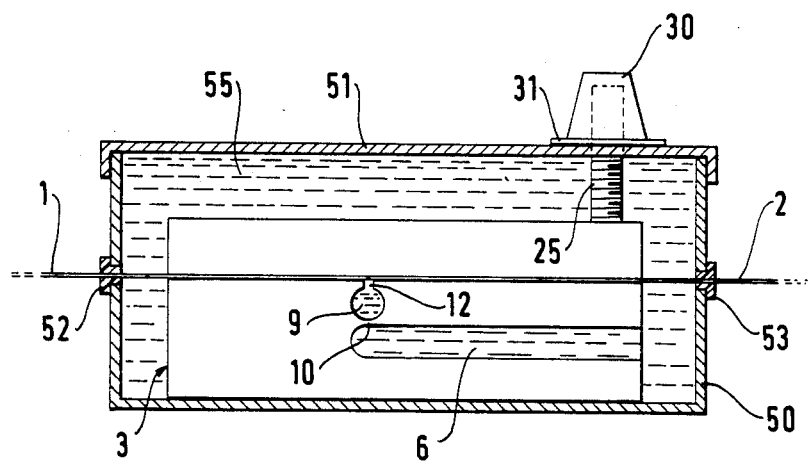
FIG. 7 illustrates a mode of utilization of the previously illustated optical attenuators.

FIG. 7 shows the variable optical attenuator according to the invention mounted in a case 50 closed by a cover 51. The fibers 1 and 2 pass through the opposite lateral walls of this case, through sealing elements 52 and 53. The rod 25 goes through the cover 51 through another sealing element not shown in the drawing, the control knob 30 being located just above the cover. The closed and sealed case 50, 51 is preferably filled with a liquid, as illustrated, such as that known by the name Opanol or Eucalyptol, having a refraction index approximately equal to that of the fiber cores. This liquid provides a junction interface between the two fibers 1 and 2 to improve their coupling.

The invention has been described with reference to the embodiments specifically illustrated by the drawings. Obviously minor modifications and/or substitutions of the means described by technically equivalent means will occur to those skilled in the art without departing from the scope and spirit of the invention. In particular, the slot forming window 12 could be done away with so that the cylindrical hole 9 itself forms a window by opening directly at the level of the supporting surface 4. Also, it is not mandatory for the dividing slit 6 to extend approximately halfway through the block 3. Alternatively, for example, it can be made longer so as to provide an even greater reduction between the movement of the free end of branch 7 and the movement of the coupling end of the fiber carried thereon.

We claim:

1. A variable optical attenuator for achieving a variable coupling between the ends of two optical fibers, by moving the end of one of the optical fibers along a circular arc passing through the end of the other fiber, said attenuator comprising: a support, said support comprising a rectangular block having a broad fiber supporting surface, said block being provided with a slit in one of its ends, parallel to said broad supporting surface and being of a length to establish first and second block branches, one to each side thereof and parallel to each other, a said first branch being bounded by said supporting surface said block being further provided with a cylindrical through hole transversely crossing said first branch substantially in line with the inside end of the slit and opening onto said supporting surface to establish a coupling zone between said fibers, and means for rotatively driving said first branch by elastic deformation of said block first branch adjacent said cylindrical hole and acting substantially on the free end of said first branch and wherein said fibers are mounted end to end in general alignment on said broad fiber supporting surface and perpendicular to the axis of said through hole with the junction of fibers overlying said opening of said cylindrical through hole onto said broad fiber supporting surface, whereby said fiber mounted to the portion of the broad supporting surface of said first branch rotates about said circular arc in a plane perpendicular to the axis of said through hole and whose center lies at the area of elastic deformation of the block first branch adjacent said cylindrical through hole.

2. A variable optical attentuator according to claim 1, wherein said cylindrical through-hole separates said block-dividing slit by a wall having a thinnest part constituting a hinge about which said first branch pivots when actuated by said driving means.

3. A variable optical attenuator according to claim 2, wherein said cylindrical through hole is opened for communication with said supporting surface via a transverse window located substantially opposite said hinge.

4. A variable optical attenuator according to claim 1, wherein said rotatively driving means include a threaded control rod, means for captively installing one end of said rod in said free end of said first branch but free to rotate therein, and a rigid bar mounted on the broad fiber supporting surface of said support block and being attached thereto along the part of said block which is not divided by said slit, and said control rod being threadably mounted through said bar and having one end engaging said first branch to pivot said first branch.

5. A variable optical attenuator according to claim 4, wherein said end of the control rod captive in said free end of the first branch of the block is of hourglass shape and said free end of the block branch has an opening therein having a matching profile including a set of ribs for mating with the hourglass shaped end of the control rod and being in mating engagement therewith.

6. A variable optical attenuator according to claim 1, wherein said fibers are secured to the block supporting surface by adhesive bonding.

7. A variable optical attenuator according to claim 1, wherein said support block is further provided with two blind holes in its broad fiber supporting surface near to each side of the coupling zone window, said holes having a larger diameter than the fibers and underlying the fibers, respectively.

8. A variable optical attenuator according to claim 1, further comprising a positioning plate having a V-groove, and wherein said fibers are positioned in said V-groove formed between the supporting surface and the side of a positioning plate mounted on said broad fiber supporting surface, said positioning plate covering part of the width thereof and being divided into two parts extending to each side from the fiber coupling zone, one of said parts being attached to said first branch of the block and the other part being attached to the non-branched part of the block.

9. a variable optical attenuator according to claim 8, further comprising two holding plates for keeping the fibers in said groove, said holding plates being mounted to substantially abut said positioning plate on the supporting surface of the block and being respectively attached to said first branch and said non-branched part of the block, each of said holding plates having a chamfered edge to apply the corresponding fiber against the bottom of said V-groove.

10. A variable optical attenuator according to claim 1, further including a closed and sealed case filled with a liquid having a refractive index substantially equal to that of the fiber cores, and immersing said fiber ends in said liquid.

* * * * *